United States Patent [19]

Hölter et al.

[11] 4,388,281
[45] Jun. 14, 1983

[54] NOXIOUS-COMPONENT REMOVAL FROM FLUE GAS AND COMPOSITIONS USEFUL THEREFOR

[76] Inventors: Heinz Hölter, Beisenstrasse 39-41, D-4390 Gladbeck; Heinz Gresch, Franz-Lehar-Strasse 25, D-4600 Dortmund-Wickede; Heinrich Igelbüscher, Marq-en-Baroeul-Str. 60; Heribert Dewert, Bahnhofstrasse 23, both of, D 4390 Gladbeck, all of Fed. Rep. of Germany

[21] Appl. No.: 266,291

[22] Filed: May 22, 1981

[30] Foreign Application Priority Data

| May 24, 1980 | [DE] | Fed. Rep. of Germany | 3020016 |
| May 24, 1980 | [DE] | Fed. Rep. of Germany | 3020049 |
| Jul. 8, 1980 | [DE] | Fed. Rep. of Germany | 3025778 |
| Mar. 21, 1981 | [DE] | Fed. Rep. of Germany | 3111268 |
| Apr. 4, 1981 | [DE] | Fed. Rep. of Germany | 3113788 |
| Apr. 23, 1981 | [DE] | Fed. Rep. of Germany | 3116086 |
| Apr. 28, 1981 | [DE] | Fed. Rep. of Germany | 3116701 |
| Apr. 28, 1981 | [DE] | Fed. Rep. of Germany | 3116702 |

[51] Int. Cl.³ .......................................... B01D 53/34
[52] U.S. Cl. ..................... 423/210; 423/235; 423/239; 423/240; 423/242; 423/243; 423/244; 252/189; 252/190; 252/192; 252/430; 422/168; 422/170
[58] Field of Search ............. 423/210, 210 S, 225, 423/226, 230, 232, 240 R, 240 S, 242 D, 243, 244 A, 242 R, 244 R, 235, 239; 252/180, 190, 192, 430; 422/168-171; 55/381, 382

[56] References Cited

U.S. PATENT DOCUMENTS

| 1,951,992 | 3/1934 | Perkins | 423/228 |
| 2,052,892 | 9/1936 | Murray | 423/242 |
| 3,784,478 | 1/1974 | Ahwicker et al. | 423/239 |
| 3,785,119 | 1/1974 | McIlvaine | 423/242 |
| 4,041,130 | 8/1977 | Mackles | 423/220 |
| 4,061,476 | 12/1977 | Hölter | 55/77 |
| 4,080,428 | 3/1978 | Hölter | 423/242 |
| 4,123,355 | 10/1978 | Frosch | 423/242 |
| 4,164,554 | 8/1979 | Kulik | 423/242 |
| 4,222,993 | 9/1980 | Holter et al. | 423/242 |
| 4,309,393 | 1/1982 | Nguyen | 423/244 |

FOREIGN PATENT DOCUMENTS

| 2615828 | 10/1977 | Fed. Rep. of Germany | 55/77 |
| 2532373 | 12/1978 | Fed. Rep. of Germany | 423/242 |
| 452644 | 4/1967 | Japan | 422/169 |

*Primary Examiner*—Earl C. Thomas
*Attorney, Agent, or Firm*—Berman, Aisenberg & Platt

[57] ABSTRACT

By separating a noxious-component-containing flue gas into two separate streams, subjecting one of these streams to dry purification and the other to wet purification, and recombining the resulting purified streams, purified flue gas is obtained at a temperature greater than the dew point of remaining corrosive constituents. This makes it possible to disseminate the recombined product through pipes and chimneys without a deleterious effect thereon.

The beneficial results are obtained without having to heat the recombined gas stream even though the wet-purification process yields purified gas at a temperature far below that which is desired.

Both the dry- and the wet-purification processes are significantly enhanced by incorporating piperazine in treating materials. Sorption agents used in the dry purification are reused in the wet purification, enhancing the efficiency of the disclosed system.

21 Claims, 4 Drawing Figures

NOXIOUS-COMPONENT REMOVAL FROM FLUE GAS AND COMPOSITIONS USEFUL THEREFOR

RELATED APPLICATIONS AND PATENTS

The disclosure herein is related to that of German Patent Application No. 2,532,373 (relied upon for priority rights by U.S. Pat. Nos. 4,080,428 and 4,222,993) and German Patent Application No. 2,615,828 (relied upon for priority rights by U.S. Pat. Nos. 4,061,476 and 4,201,751). Certified copies of the German Applications have been appropriately provided and are presented in indicated files at the U.S. Patent and Trademark Office. Relevant text of the cited German Patent Applications and of each of the noted U.S. Patents is incorporated herein by reference.

TECHNICAL FIELD

Purification of flue gases presents a number of problems. Some of these are solved by processes, apparatus and sorption compositions presented in the ensuing disclosure.

BACKGROUND ART

Flue gas has been contacted with a washing liquid containing free calcium ions which react with sulfur dioxide and with other noxious components contained in the flue gas to form corresponding calcium compounds. Calcium is added to the washing liquid as calcium oxide, calcium hydroxide and, optionally, as calcium carbonate (in part). Precipitated insoluble calcium compounds, primarily calcium sulfate in gypsum form, are removed from the washing liquid by sedimentation in a suitable device, e.g. a double-casing heavy-to-medium gravitational separator, and subsequently dried and deposited or further processed as gypsum. By suitably conducting the procedure and by adding carboxylic acid to the washing liquid, an extraordinarily high degree of purification can be achieved. Reference in this regard is made to German Patent Application No. 2,532,373. A very high stoichiometric efficiency in relation to the charged calcium oxide is thus obtained.

According to this and other wet methods, however, there is a disadvantage that the purified flue gas is severely cooled during purification. In fact, the resulting purified gas is ordinarily at a temperature of only about 55° C. At such a low temperature the flue gas is not adequately disseminated in the atmosphere. Moreover, it is below the dew point of acids retained in the purified gas, thus subjecting various ducts and chimneys (through which purified flue gas is conducted) to severe damage by corrosion.

STATEMENT OF INVENTION

This invention relates to methods, devices and sorption compositions for removing sulfur dioxide and other noxious substances, such as hydrogen chloride, hydrogen fluoride and nitrogen oxides, from flue gases. Such gases originate from combustion of mineral or fossil fuel, e.g. hard coal, brown coal or petroleum, in power plants, as well as those which originate from combustion of other materials, such as refuse.

To avoid the noted disadvantages and damage, purified flue gas is heated to a temperature of at least 100° C. or by about 45° C. As a practical matter heat exchangers have not been feasible for this purpose, and fuel is required to provide the necessary heat. Additional waste gas, which must also be purified, is thus produced, and the concomitant cost is very high. Wet purification of flue gas costs about one German pfennig per kwh generated, and reheating of purified flue gas costs another 0.5 German pfennig per kwh generated. The required reheating thus costs half again as much as the wet purification itself.

The purpose of this invention is to remove sulfur dioxide and other noxious components from flue gases without permitting purified flue gas to cool below 100° C., thus eliminating any need to heat the purified flue gas. Attendant disadvantages and costs are also eliminated. A further purpose is to achieve an equally high degree of purification, equally good stoichiometric utilization of calcium oxide and solid reaction product which is just as suitable for dumping or further processing as in the case of known wet purification methods.

The purposes of this invention are achieved by dividing raw flue gas into two parts, one of which is subjected to dry purification and the other of which is subjected to wet purification. The dry purification is effected with a powdery sorption agent, such as calcium oxide and/or calcium hydroxide, whereas wet purification is effected with a washing liquid containing at least one of the same agents. The sorption agent used for dry purification is added entirely or partly to the washing liquid used during wet purification. According to German Patent Application No. 2,615,828, flue gases can be purified by intimately contacting them with a dry sorption agent capable of reacting with sulfur dioxide and other noxious substances in flue gas and thus removing them from the flue gas to a significant extent. The sorption agent is, e.g., an alkali and/or alkaline-earth metal compound or hydrate of lime in powder form.

After the reaction the gas and the sorption agent are separated from each other, and the sorption agent is available for recycling into the gas current. A large stoichiometric surplus of sorption agent is required to achieve a satisfactory degree of purification by this method. In practice, the sorption agent can only be used to half of its stoichiometric equivalency, even when using a calcium oxide or calcium hydroxide. This involves high sorption-agent cost and precludes dumping of used sorption agent. Even though processing used sorption agent into gypsum in a separate process is possible, such is also rather costly.

A way has now been devised to avoid all of the previously-noted disadvantages. Heating the purified flue gas is not required, and the gypsum reaction product is suitable both for dumping and for further processing. In addition, the charged calcium oxide or calcium hydroxide is completely used in stoichiometric terms. The purified flue gas is in a form suitable for rapid and uniform distribution into the atmosphere. In one preferred version separately processed flue gas fractions are combined prior to introduction into a chimney. This prevents damage (due to cold flue gas coming from wet purification) to the chimney or to any intermediary flue-gas ducts.

BRIEF DESCRIPTION OF THE FIGURES OF DRAWING

DETAIL DESCRIPTION

Figure 1:
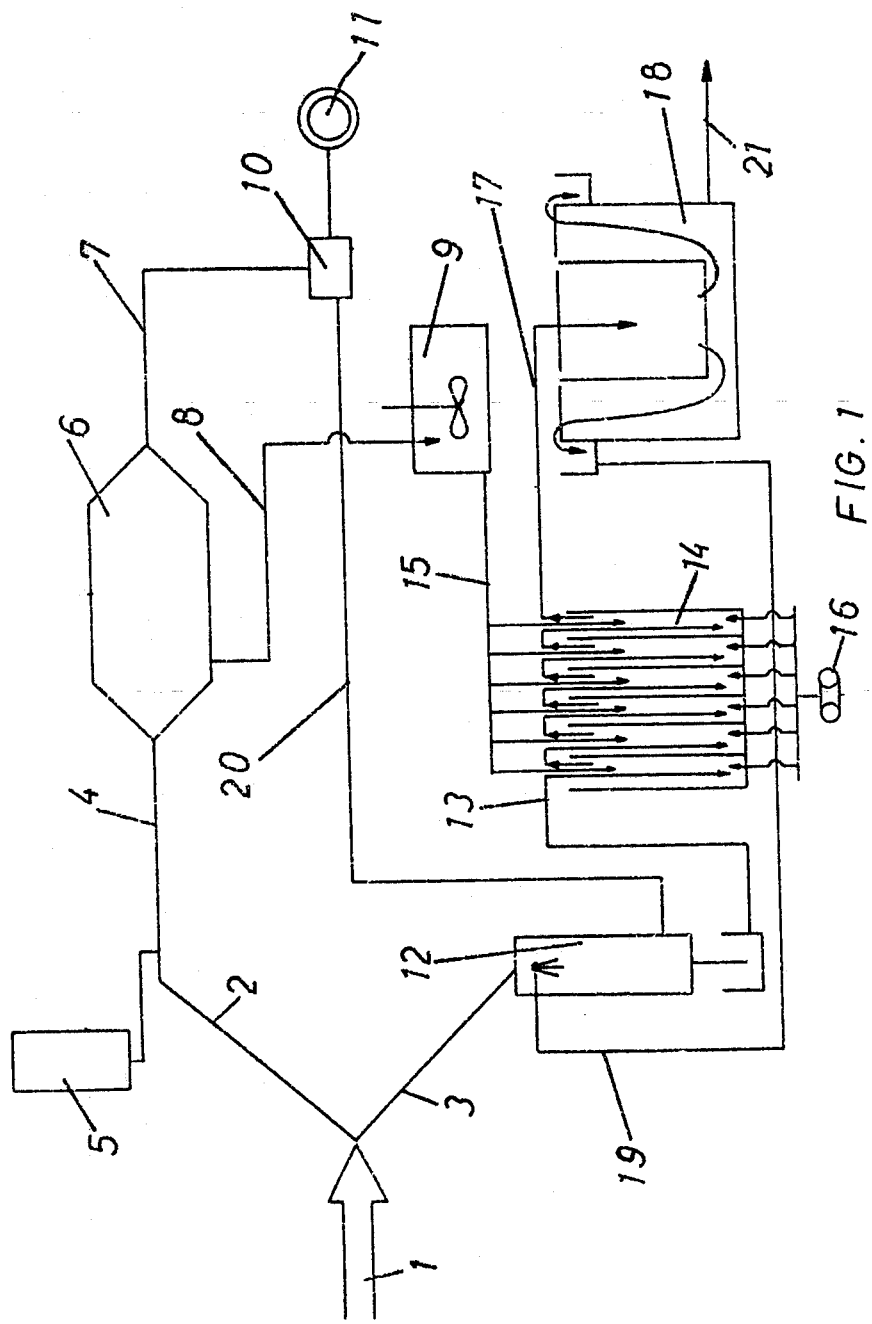
FIG. 1 is a schematic flow diagram of apparatus for and a process of transforming raw flue gas to a form suitable for dissemination into the atmosphere.

Sorption agent employed in dry purification is cycled. Fresh sorption agent is introduced, and used sorption agent is withdrawn on a regular basis to adjust the kind and degree of utilization of sorption agent in the dry purification. This leads to a high degree of purification and provides sorption agent which is still particularly suitable for use in wet purification.

Prior to conducting into wet purification the sorption agent used in dry purification, grinding the used sorption agent is advisable. Such grinding produces new and free surfaces and thus increases the reaction capability of the used sorption agent. It is also advantageous to mix thus-used sorption agent with water to obtain milk of lime prior to introducing it into the wet-purification washing liquid cycle.

It is also possible to introduce used (but not completely spent) sorption agent from dry purification into a furnace in which it reacts completely or almost completely with flue-gas sulfur dioxide. Through this step alone the degree of utilization of sorption agent is increased from about 50 percent (in dry purification) to more than 80 percent. As an example a mixture of sorption agent and air is blown into the flame through a nozzle. On the other hand the sorption agent may be mixed together with the coal. Mixing the sorption agent with coal is preferably used when firing soft coal. Through this step the amount of noxious components, e.g. sulfur dioxide in the flue gas may be reduced by approximately 30 percent.

Dry purification is advantageously developed so that intimate contact between the flue gas and the sorption agent (in one or more contact segments) is followed by filtering to separate the sorption agent from the flue gas. The contact segments, such as those of U.S. Pat. No. 4,061,476, provide intensive intimate and thorough mixing of the flue gas with the sorption agent and a correspondingly extensive reaction of the sorption agent with noxious components of the flue gas. The contact and reaction are further continued in a filter in which the sorption agent is separated from the flue gas.

According to an alternative form of this invention, raw flue gas is initially prepurified dry in a series-connected advance prepurification stage. Part of the thus-prepurified gas is subjected to dry purification, and another part thereof is subjected to wet purification. Fresh sorption agent is employed for the dry purification, and sorption agent used in the dry purification is completely or partially supplied to the prepurification stage and subsequently to the wet-purification stage. By this means the degree of utilization of the sorption agent is materially increased. This method is optionally modified by altering the proportion of prepurified gas subjected to wet purification. Reducing the amount of gas processed by wet purification is advantageous since wet purification consumes more energy than dry purification.

By adding carboxylic acid to washing liquid employed for wet purification, the supply of free calcium ions in the washing liquid is increased, thus increasing the reaction speed; the quantity of circulating washing liquid can thus be reduced. According to another feature of the invention piperazine (especially in the form of piperazine-hexahydrate and/or piperazine-citrate) is added to the washing liquid and/or to the sorption agent (during dry purification). Equally good, if not better, results are thus obtained during wet purification than were previously possible with the addition of a carboxylic acid, even if the quantity of piperazine added is only half or a quarter that of carboxylic acid. Surprisingly, corresponding results are also achieved by adding piperazine (or one of its noted counterparts) to the sorption agent employed in dry purification. A particular advantage of using piperazine or one of the other noted compounds is that these compounds are toxically unobjectionable and have a vaporization point in excess of 100° C.

During wet purification, oxidation of the washing liquid is accomplished, e.g., in various stages, whereby sorption agents from dry purification and, possibly, from prepurification are added to the stages in such quantities that the pH value of the washing liquid increases only slightly from one stage to the next and rises to about 7.5 only during the last stage. Calcium hydroxide or milk of lime is optionally added to the last stage to achieve this end. In this procedure calcium sulfite (contained in the washing liquid, to which sorption agent from dry purification is added) is oxidized in the first oxidation stages at a pH value of less than 6, preferably around 4.5, to calcium sulfate via calcium bisulfite; this yields a gypsum which is particularly easy to separate and which is especially suited for further processing.

During separation (in fabric filters) of sorption agent from flue gas purified in the dry purification, the gas is conducted along with the sorption agent from the top down, dropping through the fabric or tissue filters. The filter surfaces advantageously have a substantial height, which should be at least 3 or even 3.5 and, preferably, about 5 meters. They are advantageously provided with bracing bars or bracing rings to prevent undesired dropping of sorption agent from the filter surfaces. Continuation of the chemical sorption reaction between the flue gas and the sorption agent is thus achieved on the filter surfaces, resulting in an increased degree of purification. This is further assisted by the fact that only a small portion of the filter surfaces, preferably not more than 2 percent, is treated, vibrated in order to remove the collected sorption agent from the filter surfaces, at the same time. In practice a great number of filter bags or filter pockets are used at the same time for purification of gas, and a pulse of compressed air is injected into one of them to vibrate or shake the filter cloth, whereby the sorption agent falls off. Each filter bag or filter pocket is typically treated every fifteen minutes. The filter cloth is preferably a woven fabric made from polytetrafluoroethylene.

FIG. 1 illustrates one version of the method and suitable apparatus. The number 1 represents a flue-gas or waste-gas current that has to be purified. The gas is, e.g., dry flue gas from a coal-fired power plant and has a temperature of about 180° C. This flue gas current is subdivided into subcurrents 2 and 3. In this example each of the flue gas currents 2 and 3 contains half of the flue gas present in current 1, but other suitable divisions are similarly processed. Flue gas current 2 is subjected to dry purification. Dry purification involves, e.g., a method and a plant as described in detail in German Patent Application No. 2,615,828 (cf. corresponding U.S. Pat. No. 4,061,476). In the following the illustration of the method and of the apparatus is greatly simplified. The flue gas flows into a contact section 4 in which sorption agent is added to it from a storage tank 5. The sorption agent is, for example, dry, powdery calcium oxide. In contact segment 4 the flue gas and the sorption agent are intensively mixed with each other. This is achieved through inserted accessories which are arranged in the contact segment and which are described in greater detail in German Patent Application No. 2,615,828. At least a part of the powdery calcium oxide (added to the flue gas) is once again broken up and comminuted in the contact segment so that additional surfaces are exposed. A part of the calcium oxide is also converted into calcium hydroxide by water vapor present in the flue gas. Both calcium compounds react with sulfur dioxide (present in the flue gas) to form calcium sulfate and calcium sulfite. In this example the kind of quantity of calcium oxide that would stoichiometrically correspond to twice the sulfur dioxide present in the flue gas is admixed with the flue gas. The separation of the sorption agent from the purified flue gas is accomplished in tissue filter 6. Within the tissue filter the reaction of flue gas with calcium oxide and/or calcium hydroxide continues if not already complete. The flue gas, purified and relieved of its sorption agent, is supplied via a pipeline 7 to a mixing chamber 10 and from there into a chimney 11. The separated sorption agent (a mixture of calcium oxide, calcium hydroxide, calcium sulfate and calcium sulfite) is supplied via a pipeline 8 to a preparation device 9, preferably an agitator tank in which it is mixed with water in order to obtain milk of lime. Deviating from the example, a part of the used sorption agent is optionally recycled for further dry purification.

The flue-gas subcurrent 3 is purified wet. For this purpose it is supplied to a gas scrubber 12. After purification, it is conducted via pipeline 20 into the mixing chamber 10, where it is mixed with the dry flue gas supplied through pipeline 7. The mixture is conducted into chimney 11. The wet purification method and the system used for its implementation are described only in a severely simplified manner. A detailed description is found, e.g., in German Patent Application No. 2,532,373, which corresponds with U.S. Pat. No. 4,080,428. For wet purification a washing liquid (conducted in a cycle) is supplied to the gas scrubber 12 via a pipeline 19. This washing liquid contains (among other components) calcium oxide and calcium hydroxide; these compounds are highly dissociated and continue to dissociate in the scrubber so that a large supply of free calcium ions is available for removal of sulfur dioxide from the flue gas. After running through the scrubber 12, the washing liquid is supplied via a pipeline 13 to an oxidation device 14.

Air is blown into oxidation device 14 through a blower 16. Milk of lime is supplied to the oxidation device through a pipeline 15 from the milk-of-lime preparation device 9. The washing liquid, oxidized and mixed with milk of lime, leaves the oxidation device 14 via a pipeline 17 and is thus conducted into a double-casing gravitational separator 18. In the latter calcium sulfate (formed in the washing liquid) is separated. Substantially clear effluent (washing liquid) leaves the double-casing gravitational separator and is returned into gas scrubber 12 through pipeline 19. Calcium sulfate (gypsum) is removed from the double-casing gravitational separator 18 through pipeline 21.

To conduct the flue gas through the purification devices, fans are optionally arranged in pipelines 7 and 20, but they are not shown in the drawing.

The temperature of the flue gas at 1 is 180° C. The temperature is only slightly lower in pipeline 7. In pipeline 20, the wet-purified flue gas has a temperature of about 55° C. When the flue gas is distributed uniformly between subcurrents 2 and 3, a temperature of 117° C. is obtained in mixing chamber 10. Consequently, the flue gas can readily be piped at this temperature into chimney 11. The temperature of 117° C. is above the dew point of corrosive acids, especially hydrogen chloride, still in the gas, and the temperature is high enough to assure complete mixing with and spreading into the atmosphere of flue gas emanating from the chimney. It is not necessary to heat the flue gas prior to piping it into the chimney. Considerable saving in power plant output is thus achieved. While about 1% of installed power plant capacity is required for operation of purification plants, for their power consumption resulting from pumps, fans, and the like, an additional 3 percent of installed power plant capacity would be required for reheating the flue gas.

The oxidation device 14, illustrated in FIG. 1, differs from that of German Patent Application No. 2,532,373. The former is built in several stages and is so operated by adding (to the stages) sorption agent from dry purification and, possibly, also from a prepurification stage in such quantities that the pH value of the washing liquid increases only slightly from one stage to the next (rising to about 7.5 only in the last stage). In addition, calcium hydroxide or milk of lime is added, as required, to the last stage. The pH value is kept below 6, preferably around 4.5, in the first stages. Accordingly, oxidation of the substances, especially calcium bisulfite and calcium sulfate, supplied from scrubber 12 and from the dry purification stage into calcium sulfate (which is easily separated from the washing liquid in the double-casing gravitational separator 18, which is readily dehydratable and which is suitable for further processing) is thus effected.

Figure 2:
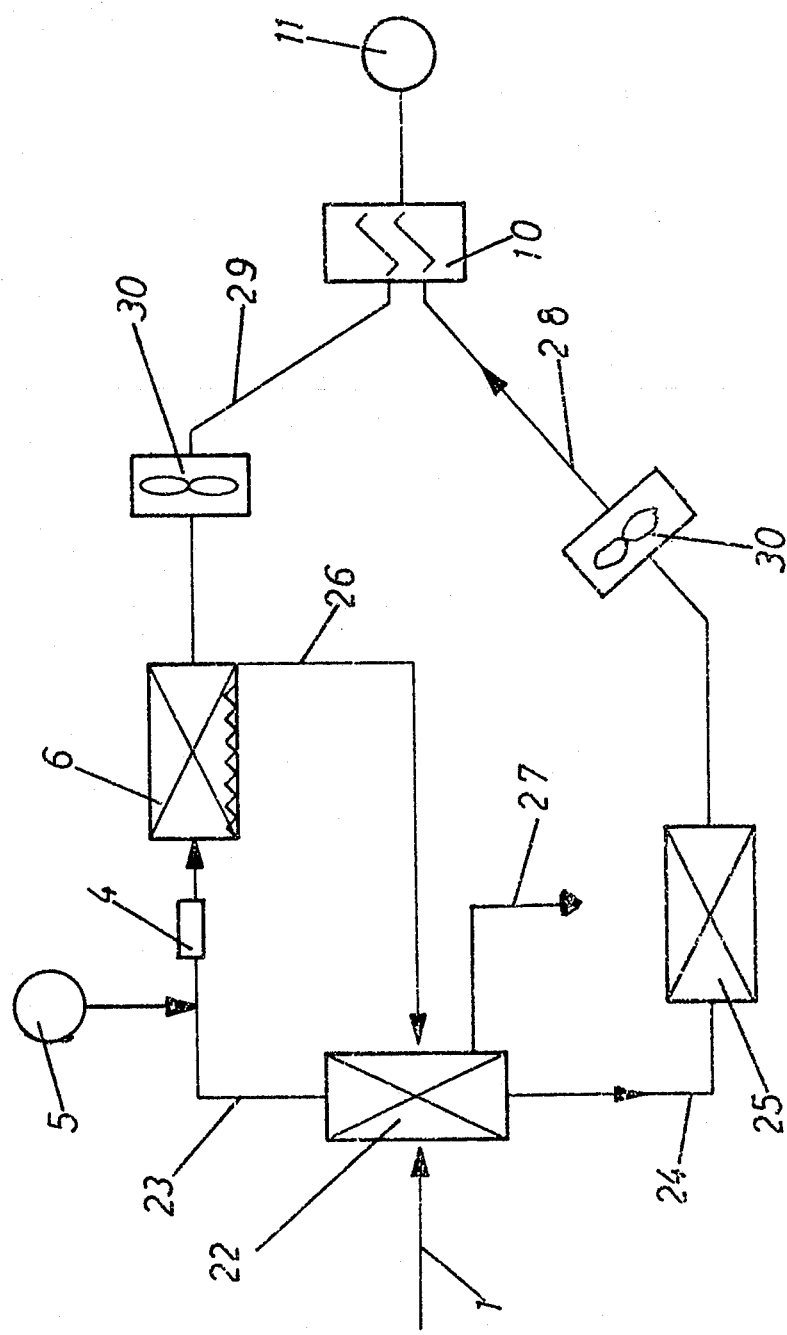
FIG. 2 is a schematic flow sheet for a greatly simplified version of the method.

A modification is illustrated in FIG. 2. Here, the unpurified flue gas current 1 is initially prepurified in a dry prepurification stage 22. A subcurrent of the dry prepurified flue gas is conducted via 23 to further dry purification. Another subcurrent is conducted via 24 to wet purification 25. Dry purification again consists of sorption-agent addition 5, a contact segment 4 and a chemical sorption filter 6. These devices are designed similar to those previously described in connection with FIG. 1 and therefore operate in a similar manner. A part of the sorption agent, separated in chemical sorption filter 6, is supplied via a pipeline 26 to the prepurification stage 22. The prepurification stage 22 is effected, e.g., by a fluidized-bed reactor, as it is well known in the art, from which the prepurified flue gas current 23 contains little or no sorption agent. The sorption agent used in the prepurification stage 22 is at least partially conducted via pipeline 27 to wet purification 25. In FIG. 2, wet purification is illustrated in a greatly simplified manner; it substantially corresponds to wet purification illustrated in FIG. 1. The dry-purified flue gas is conducted via a pipeline 29, and the wet-purified flue gas is conducted via a pipeline 28, to mixing chamber 10 and from the latter into chimney 11. Fans 30 are used to transport the flue gas.

According to the modification, illustrated by FIG. 2, the sorption agent added at 5 encounters flue gas which has already been prepurified in 22. Accordingly, (without any need for adding a larger quantity of fresh sorption agent) there is a considerable increase in the stoichiometric ratio, e.g. from 2:1 to 3:1, of the effective components of the sorption agent with respect to the sulfur dioxide contained in dry purification, so that a considerably higher degree of purification is achieved from dry purification. There is no impairment of the degree of purification is wet purification because of that. On the whole, the degree of purification of the entire system is increased. The share of the dry-purified flue gas is optionally increased at the expense of the wet-purified flue gas to reduce the energy consumption of the entire plant.

By altering the method illustrated by FIG. 2, a considerable portion of the sorption agent (used in prepurification stage 22) is alternatively used for dry purification. Likewise, sorption agent (separated in chemical sorption filter 6) is optionally conducted partially into prepurification stage 22 and partially into wet purification 25.

In the wet purification method described in German Patent Application No. 2,532,373 (corresponding to U.S. Pat. No. 4,080,428), carboxylic acids are added to the circulating washing liquid to increase the degree of dissociation. In another version of the method according to the invention, piperazine and/or piperazine-hexahydrate and/or piperazine-citrate is added to the washing liquid during wet purification to increase the degree of dissociation. These substances need to only be added in a considerably smaller quantity (about 0.2 to 0.5 of the quantities of carboxylic acids) in order to achieve the same or better effect; besides, these substances are completely unobjectionable on the basis of toxicity and have vaporization points in excess of 100° C. Quite surprisingly, these substances are also suitable for addition to the sorption agent during dry sorption and develop a similar effect there.

During dry purification, special advantages for separating gas and sorption agent in the tissue filters are achieved by adding the sorption-agent-containing gas from the top down, dropping through tissue filters, of which (on the average) no more than 2%, is treated e.g., vibrated in order to remove the collected sorption agent from the filter surfaces at the same time. Filter surfaces having a substantial height, at least 3 m or even 3.5 m and, preferably, around 5 m, and additional bracing bars or bracing rings on the tissue surfaces (preventing sliding of sorption agent from the tissue surfaces) are advantageously used. This assures significant reaction between the sorption agent and the flue gas in the tissue filter. It is thus possible either to increase the degree of purification or to operate with a reduced stoichiometric ratio of the effective constituents of sorption agent with respect to the noxious substances in the flue gas.

Figure 3:
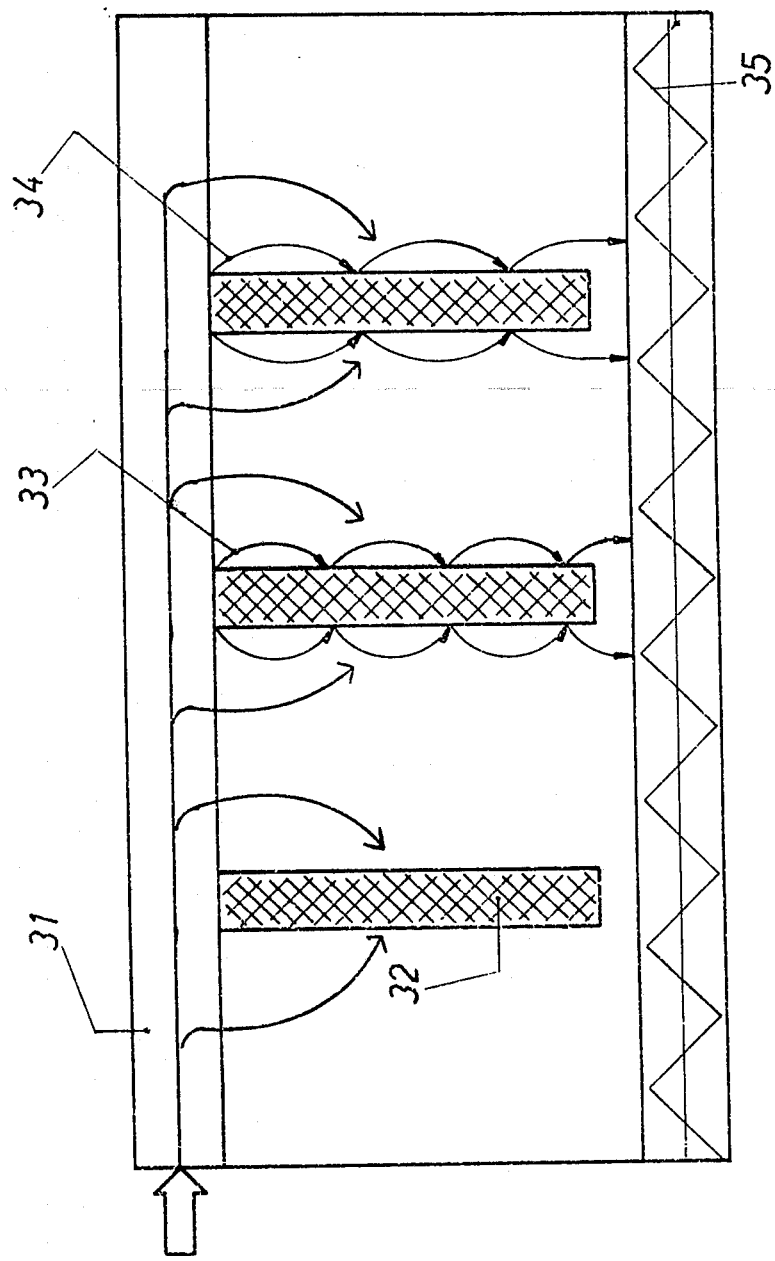
FIG. 3 is a schematic diagram of a perpendicular cross-section through a fabric or tissue filter.
Figure 4:
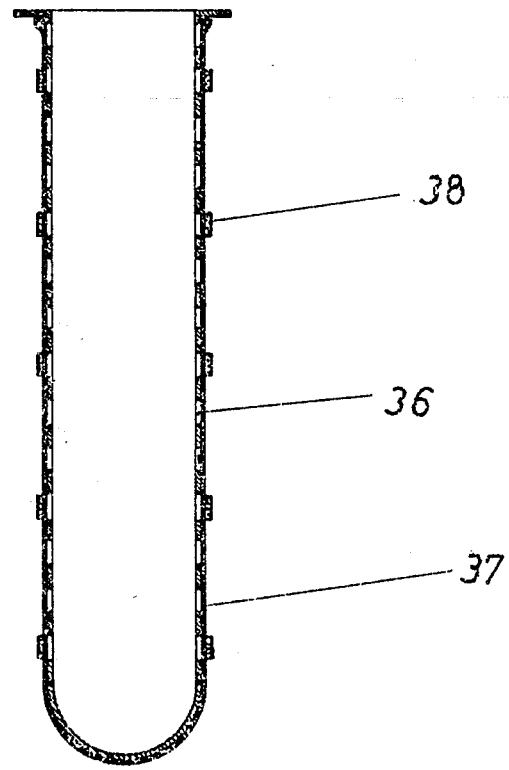
FIG. 4 is a perpendicular cross-section through a filter element of the fabric or tissue filter of FIG. 3.

These filters, which constitute an aspect of the invention, are illustrated as practical examples in FIGS. 3 and 4. FIG. 3 shows the raw gas duct labeled 31. The filter elements are labeled 32. These are pocket-like or hose-like tissue-filter elements.

Flue gas mixed with the used sorption agent and, optionally with fresh sorption agent as well is conducted into the flue gas duct 31. Flue gas and sorption agent enter filter chamber by dropping down on them, and the filter surfaces of those units are considerably higher than they are wide. They have a height of at least 3 meters and, preferably, of 5 meters. During final purification in the filter operation suitable selection of high shaking frequencies 33 and low shaking frequencies 34 (with corresponding amplitudes and through suitable selection of shaking times) continuously retains considerable quantities of sorption agent on the filter surfaces, where it is available to react with components of the flue gas. In the filter illustrated in FIG. 3, the sorption agent, which has fallen down, is evacuated in a dust duct 35 through, e.g., a worm gear or a scraper flight conveyor.

The undesired dropping of sorption agent from filter surfaces, as seen in FIG. 4, is prevented by bracing rings or bracing bars 38, which are arranged on the filter cloth 37 which, in turn, rests against a frame structure, perforated plate or the like 36.

The invention and its advantages are readily understood from the foregoing description. Various changes can be made in the process, the system, individual pieces of apparatus and/or in sorption media compositions without departing from the spirit and scope of the invention or sacrificing its material advantages. The described process, apparatus, systems and compositions are merely illustrative of preferred embodiments.

A typical flue gas from a coal fired power plant has a sulfur dioxide content between 2 and 4, e.g., 3 g/Nm$^3$. In the wet purification process between 90 and 93, e.g., 91.5 percent of sulfur dioxide (and of the other noxious components) are removed from the gas. The dry purification process results in e.g., 85 percent removal of sulfur dioxide. When equal parts of the flue gas have been treated dry, respectively wet, and consequently are mixed, the clean gas has a sulfur dioxide content of 0.35 g/Nm$^3$, i.e., the overall removal of sulfur dioxide is 88.33 percent.

What is claimed is:

1. A method for removing noxious components from flue gas before releasing it into the atmosphere which comprises:

dividing the flue gas into two parts, subjecting one part to dry purification and subjecting the other part to wet purification, the dry purification comprising contacting the one part with a powdery sorption agent selected from the group consisting of calcium oxide and calcium hydroxide to remove noxious components therefrom, the wet purification comprising incorporating at least one substance selected from the group consisting of calcium hydroxide and calcium oxide in washing liquid and contacting said other part with the washing liquid to remove noxious components therefrom, the substance incorporated in the washing liquid comprising used sorption agent from the dry purification.

2. A method according to claim 1 comprising incorporating said substance in used washing liquid from said wet purification, separating precipitated calcium compounds from thus-fortified used washing liquid and recycling resulting effluent as washing liquid to said wet purification.

3. A method according to claim 1 wherein said substance is mixed with or placed in the form of milk-of-lime prior to being incorporated in said washing liquid.

4. A method according to claim 1 which comprises aerating or oxidizing washing liquid employed in the wet purification and recycling liquid effluent thereof as washing liquid for subsequent wet purification.

5. A method according to claim 4 wherein aeration or oxidation is effected in progressive stages from a pH of about 4.5 to a pH of about 7.5.

6. A method according to claim 1 comprising dry prepurification of raw flue gas prior to dividing it into two parts for separate dry and wet purification.

7. A method according to claim 6 which comprises separating sorption agent from flue gas with which it had been in contact during the dry purification and recycling at least part of the thus-used sorption agent for contact with raw flue gas during the dry prepurification.

8. A method according to claim 6 wherein the dry prepurification comprises contacting raw flue gas with solid sorption agent and reusing thus-employed solid sorption agent in the subsequent wet or dry purification.

9. A method according to one of claims 1 to 8 which comprises mixing flue gas subjected to the dry purification with that subjected to the wet purification.

10. A process according to claim 9 in which the two parts into which the flue gas is initially divided is proportioned to obtain a recombined purified admixture having a temperature in excess of the dew point of corrosive constituents therein.

11. A method according to one of claims 1 to 8 which comprises comminuting sorption agent after using it in a dry purification step and before reusing it.

12. A method according to one of claim 1 which comprises reducing noxious components of flue gas from a furnace by charging into the furnace sorption agent which has been previously used in the dry purification.

13. A method according to claim 9 which comprises separating sorption agent employed in the dry purification from flue gas with which it has been in contact by passing an admixture thereof through tissue filters from the top down, the tissue filters having surfaces covered with the sorption agent, no more than 2 percent is treated, e.g., vibrated in order to remove the collected sorption agent from the filter surfaces at the same time.

14. A gas-purification system which comprises:
means to separate into two portions a raw gas stream containing noxious components,
means to contact one portion intimately with dry sorption agent to remove noxious components therefrom,
means to separate dry sorption agent from the portion in which it has been in contact,
means to admix separated dry sorption agent with milk of lime,
plural-stage fluid oxidation means,
means to adjust the pH in successive stages of the plural-stage fluid oxidation means so that such pH in successive stages increases from about 4.5 to about 7.5,
means to scrub the other of the two portions of the raw gas stream with wash liquid,
means to conduct thus-used wash liquid to the plural-stage fluid oxidation means,
means to separate effluent from solids in oxidized wash liquid,
means to recirculate effluent to the scrubbing means and
means to mix scrubbed gas with that which has been intimately contacted with dry sorption agent to form an admixture having a temperature in excess of the dew point of any corrosive constituents remaining therein.

15. A gas-purification system which comprises:
fluidized bed pretreatment means to remove noxious components from a raw gas stream;
means to separate a thus-treated stream into two portions,
means to conduct one portion to dry purification means and means to conduct the remainder to wet purification means,
the dry-purification means comprising means to add sorption agent to and intimately admix it with the one portion of pretreated gas, means to separate thus treated gas from sorption agent, means to conduct separated sorption agent to and into the fluidized bed means and means to convey separated gas to a mixing means,
the wet-purification means comprising means to scrub the remainder of the gas with washing liquid, means to withdraw sorption agent from the fluidized bed means and incorporate it in the washing liquid and means to convey thus-washed gas to the mixing means, and
means to recombine and to admix the two portions of thus treated gas in the mixing means to form one stream having a temperature in excess of the dew point of corrosive components remaining therein.

16. A sorption agent composition comprising at least one substance selected from the group consisting of calcium hydroxide and calcium oxide in combination with a piperazine compound, in aqueous-solution, with a piperazine content of approximately between 0.1 ml and 10 ml, preferably approximately 0.2, ml per liter of solution.

17. A sorption agent composition comprising at least one substance selected from the group consisting of calcium hydroxide and calcium oxide in combination with a piperazine compound, in dry form, with a piperazine content of approximately between 0.01 and 1, preferably approximately 0.02 percent by weight.

18. A composition according to one of claims 16 or 17 wherein the piperazine compound is a member selected from the group consisting of piperazine, piperazine hexahydrate and piperazine citrate.

19. A gas-purification system, for removing noxious components from flue gas before releasing it into the atmosphere, which comprises:
(a) means for dividing the flue gas into two parts,
(b) means for subjecting one part to dry purification, including means to contact it with a powdery sorption agent selected from the group consisting of calcium oxide and calcium hydroxide to remove noxious components therefrom,
(c) means for subjecting the other part to wet purification, including means to incorporate at least one substance (comprising used sorption agent from the dry purification) selected from the group consisting of calcium hydroxide and calcium oxide in washing liquid and means for contacting said other part with the washing liquid to remove noxious components therefrom.

20. A method according to claim 1 wherein the dry purification comprises contacting the one part with at least one powdery sorption agent selected from the group consisting of calcium hydroxide and calcium oxide in combination with a piperazine compound, in dry form, the combination having a piperazine content of from about 0.01 to about 1, preferably about 0.02, percent by weight.

21. A method according to claim 1 wherein the wet purification comprises incorporating in the washing liquid at least one substance selected from the group consisting of calcium hydroxide and calcium oxide in combination with a piperazine compound, in aqueous solution, the combination having a piperazine content of approximately between 0.1 ml and 10 ml, preferably approximately 0.2 ml, per liter of solution.

* * * * *